(12) United States Patent
Quan et al.

(10) Patent No.: US 7,675,403 B2
(45) Date of Patent: Mar. 9, 2010

(54) METHOD FOR ESTIMATING NUMBER OF TAGS IN SLOTTED ALOHA-BASED RFID SYSTEM

(75) Inventors: ChengHao Quan, Jilin Province (CN); Hee-Sook Mo, Daejeon (KR); Dong-Han Lee, Daejeon (KR); Ji-Hoon Bae, Daejon (KR); Gil-Young Choi, Daejon (KR); Cheol-Sig Pyo, Daejon (KR); Jong-Suk Chae, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 887 days.

(21) Appl. No.: 11/497,749

(22) Filed: Aug. 2, 2006

(65) Prior Publication Data

US 2007/0096877 A1    May 3, 2007

(30) Foreign Application Priority Data

Nov. 3, 2005    (KR) .................. 10-2005-0105074

(51) Int. Cl.
*H04Q 5/22* (2006.01)
(52) U.S. Cl. .................. 340/10.2; 340/10.1; 370/455
(58) Field of Classification Search .............. 340/10.2
See application file for complete search history.

(56) References Cited

U.S. PATENT DOCUMENTS

| 6,034,603 | A | * | 3/2000 | Steeves | 340/10.2 |
| 7,356,042 | B2 | * | 4/2008 | Ethridge et al. | 370/445 |
| 7,511,604 | B2 | * | 3/2009 | Raphaeli et al. | 340/10.2 |
| 7,532,104 | B2 | * | 5/2009 | Juels | 340/5.61 |
| 2003/0072288 | A1 | | 4/2003 | Kuffner et al. | |

FOREIGN PATENT DOCUMENTS

| KR | 1019940025225 A | 11/1994 |
| KR | 1020000013204 A | 3/2000 |
| KR | 1020040056992 A | 7/2004 |

* cited by examiner

*Primary Examiner*—Daniel Wu
*Assistant Examiner*—Naomi Small
(74) *Attorney, Agent, or Firm*—Ladas & Parry LLP

(57) ABSTRACT

Provided is a method for estimating the number of tags in a slotted Aloha-based RFID system, which can estimate the number of tags through a new statistical average scheme using the number of slots, the measured number of empty slots, and the measured number of ID slots. The estimating method includes the steps of: a) setting the number (N) of slots, the measured number ($c_0$) of empty slots, and the measured number ($c_1$) of ID slots as parameters; and estimating the number (n) of the tags by substituting the set values into $n=(N-1)/(c_0/c_1)$.

2 Claims, 6 Drawing Sheets

METHOD FOR ESTIMATING NUMBER OF TAGS IN SLOTTED ALOHA-BASED RFID SYSTEM

FIELD OF THE INVENTION

The present invention relates to a method for estimating the number of tags in a slotted Aloha-based RFID system; and, more particularly, to a method for estimating the number of tags in a slotted Aloha-based RFID system, which can estimate the number of tags through a new statistical average scheme using the number of slots, the measured number of empty slots, and the measured number of ID slots.

DESCRIPTION OF RELATED ART

Radio Frequency IDentification (hereinafter, referred to as RFID) is a wireless data collection technology that can identify, track and manage a product, animal, or person, to which a tag is attached, by reading or writing data from/to the tag having unique identification information by using radio frequency. The RFID system includes a plurality of electronic tags or transponders (hereinafter, referred to as tags) attached to a product or animal having unique identification information, and an RFID reader or interrogator for reading or writing the information contained in the tags. The RFID systems are classified into a mutual induction scheme and an electromagnetic scheme, depending on communication schemes between the reader and the tag. Also, the RFID systems are classified into a passive RFID system and an active RFID system, depending on whether the tag has its own power source. In addition, the RFID systems are classified into a long wave RFID system, a medium wave RFID system, a short wave RFID system, an ultra short wave RFID system, and a microwave RFID system, depending on use frequencies. According to these classifications, various standards have been established and is now preparing.

Accordingly, the RFID technology is a ubiquitous IT based technology that acquires, processes and uses information in real time using the RFID tag attached to the product, thereby realizing high living standard. The RFID technology is considered as a core technology that can expand the information society by distribution innovation and synchronization of real product and product information using barcode. Thus, various researches on the RFID technology are conducted around the world.

In such an RFID system, when the reader queries the tag attached to the product, the tag sends its own identifier in response to the query, thus achieving tag identification. At this point, when only one tag exists in an identification zone of the reader, the tag identification can be simply processed. On the other hand, when a plurality of tags exist, collision occurs because the respective tags respond to the reader at the same time. Large-scaled RFID system environment such as distribution has to identify a large quantity of products in real time. Therefore, an anti-collision algorithm is essentially required to efficiently identify a plurality of tags. The anti-collision algorithm can be classified into a tree based decision algorithm and a slotted Aloha-based statistical algorithm.

In recent years, the UHF band is recognized as the most suitable band in the distribution fields. To meet the strong demand of the RFID markets, the standardization for the use of the UHF band is in rapid progress, compared with other bands. "ISO/IEC 18000-6 type B" that has been already approved as the international standard in August 2004 and "EPCglobal UHF Gen2" that is preparing for adoption of "ISO/IEC 18000-6 type C" also use the slotted Aloha-based anti-collision algorithm. In addition, "ISO/IEC 18000-7" for the band of 433 MHz and "EPC C1" for the band of 13.56 MHz use the slotted Aloha-based anti-collision algorithm.

A general Aloha scheme transfers data at every transmission request. On the contrary, in the slotted Aloha-based anti-collision algorithm, a transmission time is divided into several time slots, and the respective tags select arbitrary slots and transfer data. In the RFID system, when the reader transmits information on the number of slots to the tag existing in the zone, the respective tags generate random number and select slots and then respond to the reader by loading information to be transmitted on the slots. At this point, the information on the number of the slots is contained as parameter in the query command. The ID slots having only one information can be identified by the reader. However, the slots having a plurality of information, that is, the slots where collision occurs cannot be identified, and the tags that load information on these slots have to retransmit information at next round or frame. Also, among the slots responding to the reader, the empty slots where any information is not loaded are included. For the efficient tag identification, the number of slots is set such that a ratio occupied by system efficiency, that is, the ID slots of all slots becomes highest. If the number of the slots is excessively large, it results in waste of the slots. If the number of the slots is excessively small, the collision rate between the tags increases. Thus, the number of tags and the set number of slots in the zone determine the system efficiency.

However, unlike the existing wireless communication, the RFID system has a problem that cannot know the number of tags in the zone. Therefore, the estimation of the number of tags in the zone has to take precedence. Also, based on the estimated number of tags, the number of slots has to be set to obtain the highest system efficiency.

SUMMARY OF THE INVENTION

It is, therefore, an object of the present invention to provide a method for estimating the number of tags in a slotted Aloha-based RFID system, which can estimate the number of tags through a new statistical average scheme using the number of slots, the measured number of empty slots, and the measured number of ID slots.

In accordance with an aspect of the present invention, there is provided a method for estimating number of tags in a slotted Aloha-based RFID system, the method comprising the steps of: a) setting the number (N) of slots, the measured number ($c_0$) of empty slots, and the measured number ($c_1$) of ID slots as parameters; and b) estimating the number (n) of the tags by substituting the set values into $n=(N-1)/(c_0/c_1)$.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
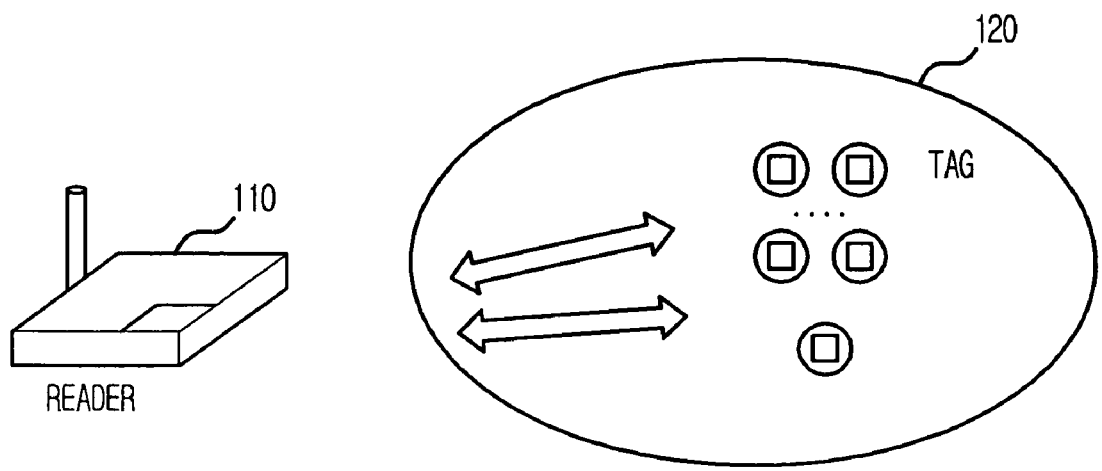
FIG. 1 is a view of an RFID system in accordance with an embodiment of the present invention.

FIG. 1 is a view of an RFID system in accordance with an embodiment of the present invention.

Referring to FIG. 1, the RFID system includes a tag 120 having unique ID information, and a reader 110 for recognizing the tag and reading the ID information from the recognized tag.

Hereinafter, a method for estimating the number of tags in a slotted Aloha-based RFID system in accordance with the preferred embodiments of the present invention will be described in detail. The existing studies on the estimation of the number of tags within a predetermined region will be first described and a new statistical average method will be then described. Moreover, the comparison and simulation results of the present invention and the prior art will be described.

Regarding the existing RFID system, standard and specification, such as "18000-6 type A", "EPCglobal Gen 2", "18000-7" and "EPC C1", was proposed. All of them use the slotted Aloha-based anti-collision algorithm, I-code algorithm, Bit-slot algorithm, and so on.

In order to explain a basic concept about the estimation of the number of tags, a general algorithm will be first described.

A reader begins a tag identification process by querying a tag using parameter of "p=<N, R, I>" where "N", "R" and "I" represent the number of slots, a seed value required for generating random values, and a tag identifier range or an information on whether to participate in tag identification, respectively. At this point, the selected tags within the region generate random values using the value of R. An arbitrary slot is selected within the range of the number of the slots, based on the random value. Then, the tag identifier information of the selected slot is loaded and transferred to the reader. The slot received by the reader may be the empty slot, the ID slot, or the collided slot.

States of the slots in one frame or one round are represented by "c=<$c_0, c_1, c_k$>", where $c_0$, $c_1$ and $c_k$ represent the number of empty slots, the number of ID slots, and the number of collided slots, respectively. Accordingly, the number of slots within a zone is estimated using the values c.

When "$c_0$" occupies most of the slots, the number of the slots must decrease. When "$c_k$" occupies most of the slots, the number of the slots must increase. If the number of the tags can be exactly estimated, the number of slots having the highest system efficiency must be newly set, and next frame or next round is started.

Regarding the estimation of the number of tags, an error minimization method is based on Cherbyshev's inequality. That is, all random values are generally distributed around an average expected value. Thus, the estimated value of the number of tags can be calculated using Eq. 1 below.

$$e_{vd}(N, c_0, c_1, c_k) = \min_n \left| \begin{pmatrix} a_0^{N,n} \\ a_1^{N,n} \\ a_k^{N,n} \end{pmatrix} - \begin{pmatrix} c_0 \\ c_1 \\ c_k \end{pmatrix} \right| \quad \text{Eq. 1}$$

In Eq. 1, "N", "n", "$a_0^{N,n}$", "$a_1^{N,n}$", and "$a_k^{N,n}$" represent the number of slots, the number of tags, the average expected value of $c_0$, the average expected value of $c_1$, and the average expected value of $c_k$. The number of tags is estimated as the value of "n" that minimizes an error between the measured value and the expected value of the slot state.

However, the implementation of this error minimization method is complicated, and the error of the estimated value is determined by how much the measured value is close to the average expected value. Also, the error of the expected value is associated with the range of "n".

Most of algorithms use a method of estimating a minimum value, which is implemented more simply than the error minimization method. The estimated value of the number of tags can be calculated using Eq. 2 below.

$$e_{min}(N, c_0, c_1, c_k) = c_1 + 2c_k \quad \text{Eq. 2}$$

The collided slots are generated because at least two tags are allocated at the same time. Thus, the estimated number of the tags in Eq. 2 means the minimum value. The method of estimating the minimum value is advantageous to estimate the number of the tags within two times range of the set number of the slots because a very large error occurs when the number of the tags exceeds two times the number of the slots, which is set with the maximum value that can be estimated as shown in Eq. 3 below.

$$e_{min}(N, c_0, c_1, c_k) = c_1 + 2c_k = 2N - 2c_0 - c_1 \leq 2N \quad \text{Eq. 3}$$

In the algorithm to which the above-described method is applied, the number of the tags is estimated through multi-steps. Also, the tags are efficiently identified by adjusting the number of the slots using a fixed slot increase/decrease method, a proportional slot increase/decrease method, or a log slot increase/decrease method, based on the ratio that "$c_0$" or "$c_k$" occupies among the entire "c".

Figure 2:
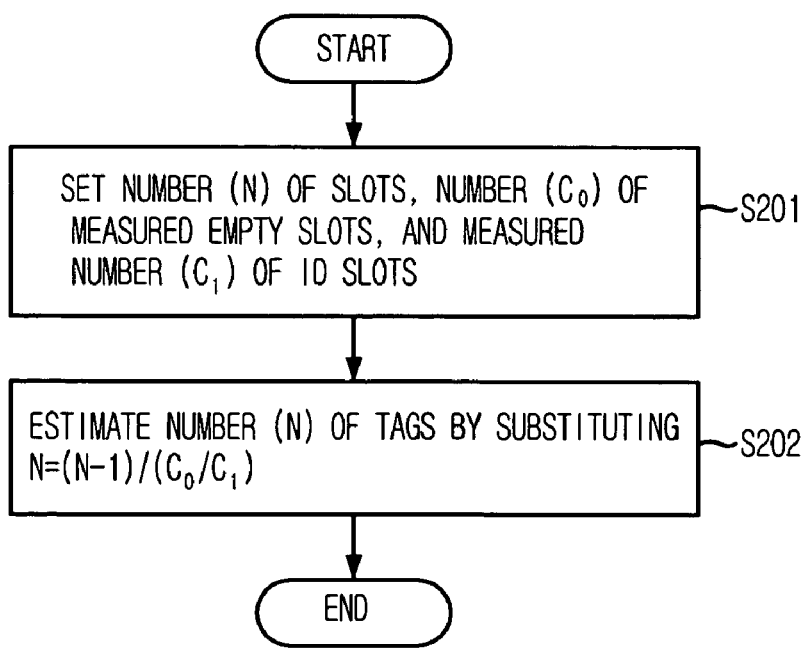
FIG. 2 is a flowchart illustrating a method for estimating the number of tags in a slotted Aloha-based RFID system in accordance with an embodiment of the present invention.

FIG. 2 is a flowchart illustrating a method for estimating the number of tags in the slotted Aloha-based RFID system in accordance with an embodiment of the present invention.

Referring to FIG. 2, the number (N) of slots, the measured number ($c_0$) of empty slots, and the measured number ($c_1$) of ID slots are set in step 201. The number (n) of tags is estimated by inserting the set value into n=(N−1)/($c_0/c_1$) in step 202.

Hereinafter, the basic mathematic background about the slotted Aloha-based anti-collision algorithm will be described.

When n number of tags communicates with the reader by using N number of slots, a probability that r number of tags will exist within a single slot follows a binomial distribution and can be expressed as Eq. 4 below.

$$B_{n, \frac{1}{N}}(r) = \binom{n}{r} \left(\frac{1}{N}\right)^r \left(1 - \frac{1}{N}\right)^{n-r} \quad \text{Eq. 4}$$

Therefore, the average number of tags that can be read during one frame or round can be expressed as Eq. 5 below and the average number of empty slots can be expressed as Eq. 6 below.

$$a_1^{N,n} = N \cdot B_{n,\frac{1}{N}}(1) = n\left(1 - \frac{1}{N}\right)^{n-1} \qquad \text{Eq. 5}$$

$$a_0^{N,n} = N \cdot B_{n,\frac{1}{N}}(0) = N\left(1 - \frac{1}{N}\right)^n \qquad \text{Eq. 6}$$

If Eq. 6 is divided by Eq. 5, the result is given by Eq. 7 below.

$$a_0^{N,n}/a_1^{N,n} = N\left(1 - \frac{1}{N}\right)^n \bigg/ n\left(1 - \frac{1}{N}\right)^{n-1} = n(N-1) \qquad \text{Eq. 7}$$

Eq. 7 can be rewritten as follows.

$$n = (N-1)/(a_0^{N,n}/a_1^{N,n}) \qquad \text{Eq. 8}$$

Therefore, the number of the tags is estimated by substituting the measured values "$c_0$" and "$c_1$" into Eq. 8, instead of "$a_0^{N,n}$" and "$a_1^{N,n}$". That is, the number of the tags is estimated using Eq. 9 below.

$$n = (N-1)/(c_0/c_1) \qquad \text{Eq. 9}$$

As described in the error minimization method, the error of the estimated value in the proposed statistical average method is determined by how much the measured value is closed to the average expected value. On the other hand, the statistical average method of the present invention has the simple calculation process and can be applied more widely than the method of estimating the minimum value.

In order to verify the performance of the method for estimating the number of tags in the slotted Aloha-based RFID system in accordance with the present invention, the comparison and simulation result between the prior art and the present invention will be described below. Specifically, the estimated number of tags, the optimal number of slots calculated using the estimated number of the tags, the states of the slots whose number is four times and eight times the number of the tags with respect to the set number of the slots, and the distribution of the estimated number of the tags will be compared and analyzed through the simulation in comparison with the method of estimating the minimum value.

Parameters set for the simulation are as follows.

The number of tags is 16-256 and the number of slots is maximum 256. For example, the number of the slots may be 16, 32, 64, or 128.

Figure 3:
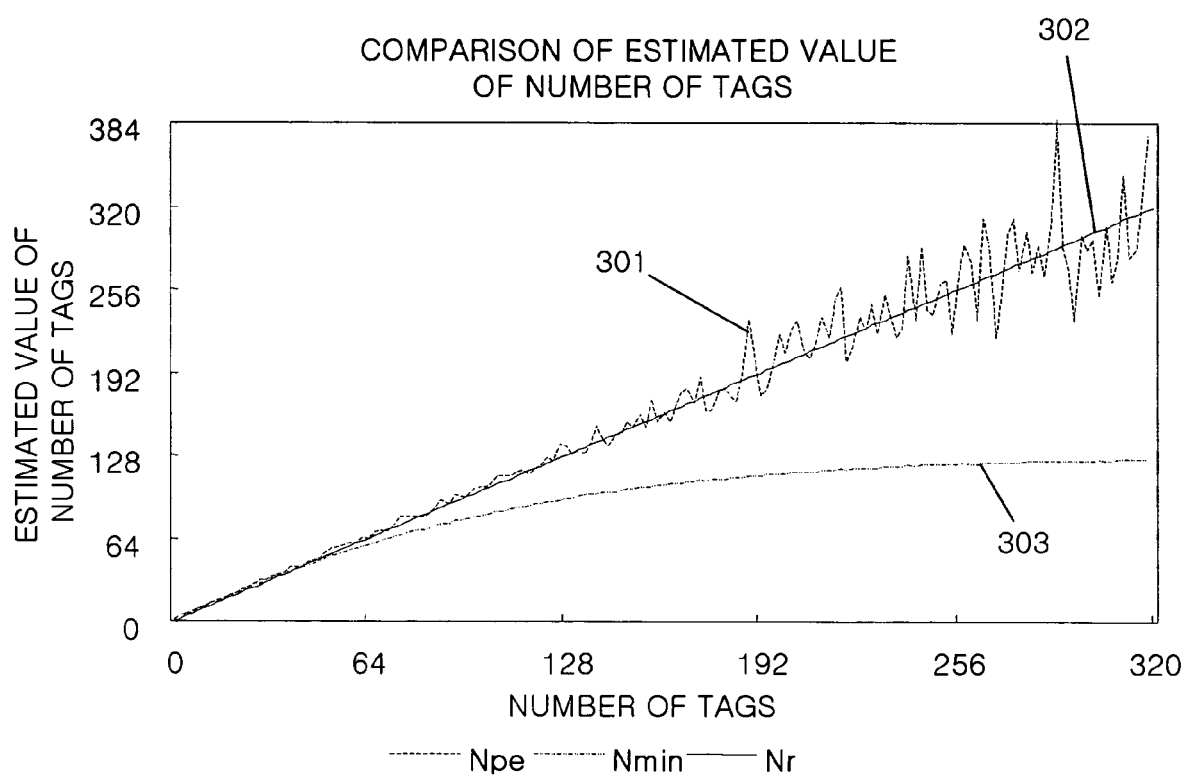
FIG. 3 is a graph illustrating comparison result of the prior art and the present invention in the estimation of the number of tags.

FIG. 3 is a graph illustrating the comparison result of the prior art and the present invention in the estimation of the number of tags. In FIG. 3, a reference numeral 301 represents the estimated number (Npe) of the tags 301, which is estimated using the statistical average method of the present invention when the number of the slots is 64, a reference numeral 303 represents the number (Nmin) of the tags, which is estimated using the method of estimating the minimum value, and a reference numeral 302 represents the real number (Nr) of the tags with respect to the increase in the number of the tags.

Referring to FIG. 3, although the error of the estimated value somewhat increases according to the increase in the number of the tags, the estimating method of the present invention obtains the result close to the real number of the tags, compared with the method of estimating the minimum value. Also, according to the method of estimating the minimum value, the error is very large when estimating more than 128 tags, which correspond to two times the set number of the slots.

Figure 4:
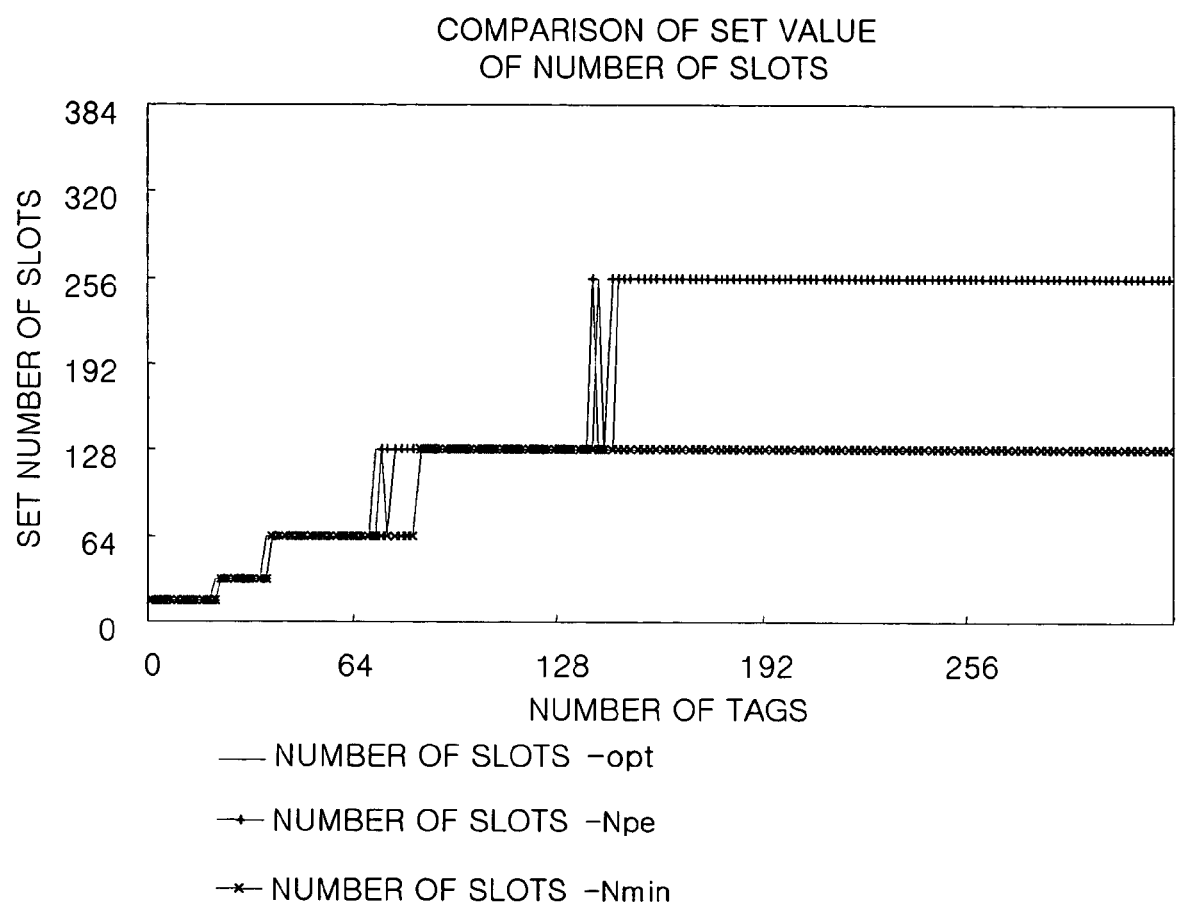
FIG. 4 is a graph illustrating comparison of the set number of slots that can optimize the system efficiency based on the estimated number of tags in FIG. 3.

FIG. 4 is a graph illustrating the comparison of the set number of the slots that can optimize the system efficiency based on the estimated number of the tags in FIG. 3.

It can be seen from FIG. 4 that the estimated number (Npe) of the slots calculated using the estimated number of the tags estimated by the estimating method of the present invention is very close to the number (opt) calculated using the real number of the tags. On the contrary, the number (Nmin) calculated using the number of the tags estimated by the method of estimating the minimum value is set to be smaller than the optimal number (opt) during the period where the number of the tags is 64-84 and the period where the number of the tags is more than 142. This means that the estimating method of the present invention improves the system efficiency much more than the method of estimating the minimum value.

Figure 5:
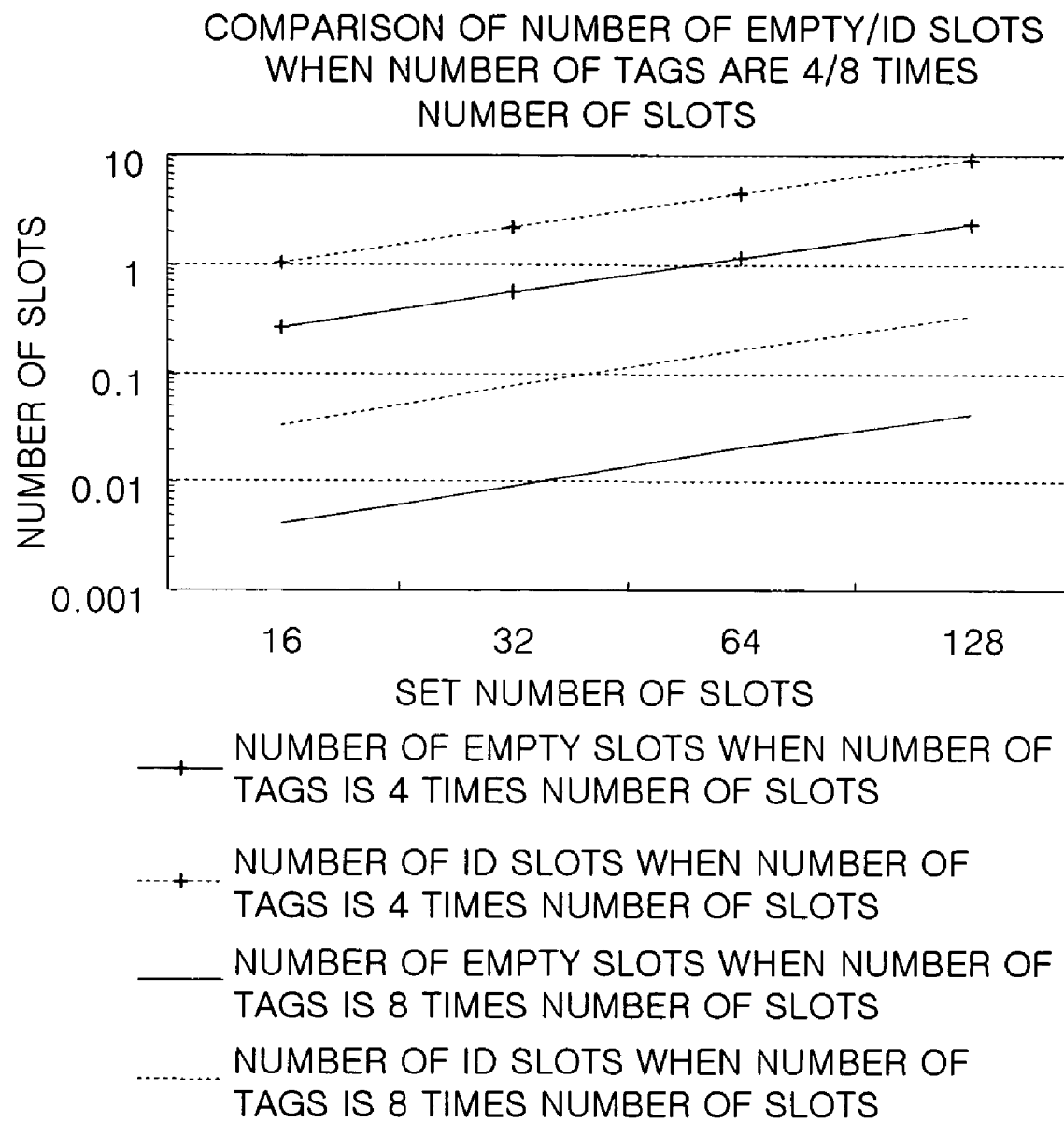
FIG. 5 is a graph of simulation result of the method for estimating the number of tags in the slotted Aloha-based RFID system in accordance with the embodiment of the present invention.

FIG. 5 is a graph illustrating the simulation result of the method for estimating the number of tags in the slotted Aloha-based RFID system in accordance with the embodiment of the present invention. Specifically, FIG. 5 illustrates the comparison of the number of the empty slots and the number of the ID slots in one frame or round when the number of the tags is four times and eight times the number of the set number of the slots.

It can be seen from FIG. 5 that the average expected value of the empty slot or the ID slot is not "1" when the number of the tags are eight times the number of the slots. That is, when the set number of the slots is ⅛ time the number of the tags, "$c_0$" and "$c_1$" are "0".

When the number of the tags is four times the number of the slots, "$c_0$" is not "1" until the number of the tags is 128, that is, the number of the slots is 32.). "$c_0$" is "1" when the number of the tags is 256, that is, the number of the slots is 64. In this case, the number of the tags cannot be estimated using Eq. 9.

In the statistical average measuring method based on the slot's triple state information "$c = <c_0, c_1, c_k>$", when either or both of "$c_0$" and "$c_1$" becomes close to "0", the error of the estimated value becomes large or the number of the tags cannot be estimated. On the contrary, when the number of the slots is very larger than the number of the tags, when the number ($c_k$) of the collided slots becomes close to "0". However, because "$c_0$" or "$c_1$" contains much more information, the estimated number of the tags becomes more correct.

In order to merely estimate the number of the tags while ignoring the system efficiency, more correct result can be obtained by setting the number of the slots to be large. In estimating 16-256 tags, the proposed method can correctly estimate the number of the tags in almost all periods when the initial number of the slots is set to 128.

The above results were based on the average expected values, and the measured values have to be used in the real algorithm. Therefore, the error of the estimated value is determined by how much the measured value is close to the average expected value. Moreover, the system efficiency is determined.

Figure 6A:
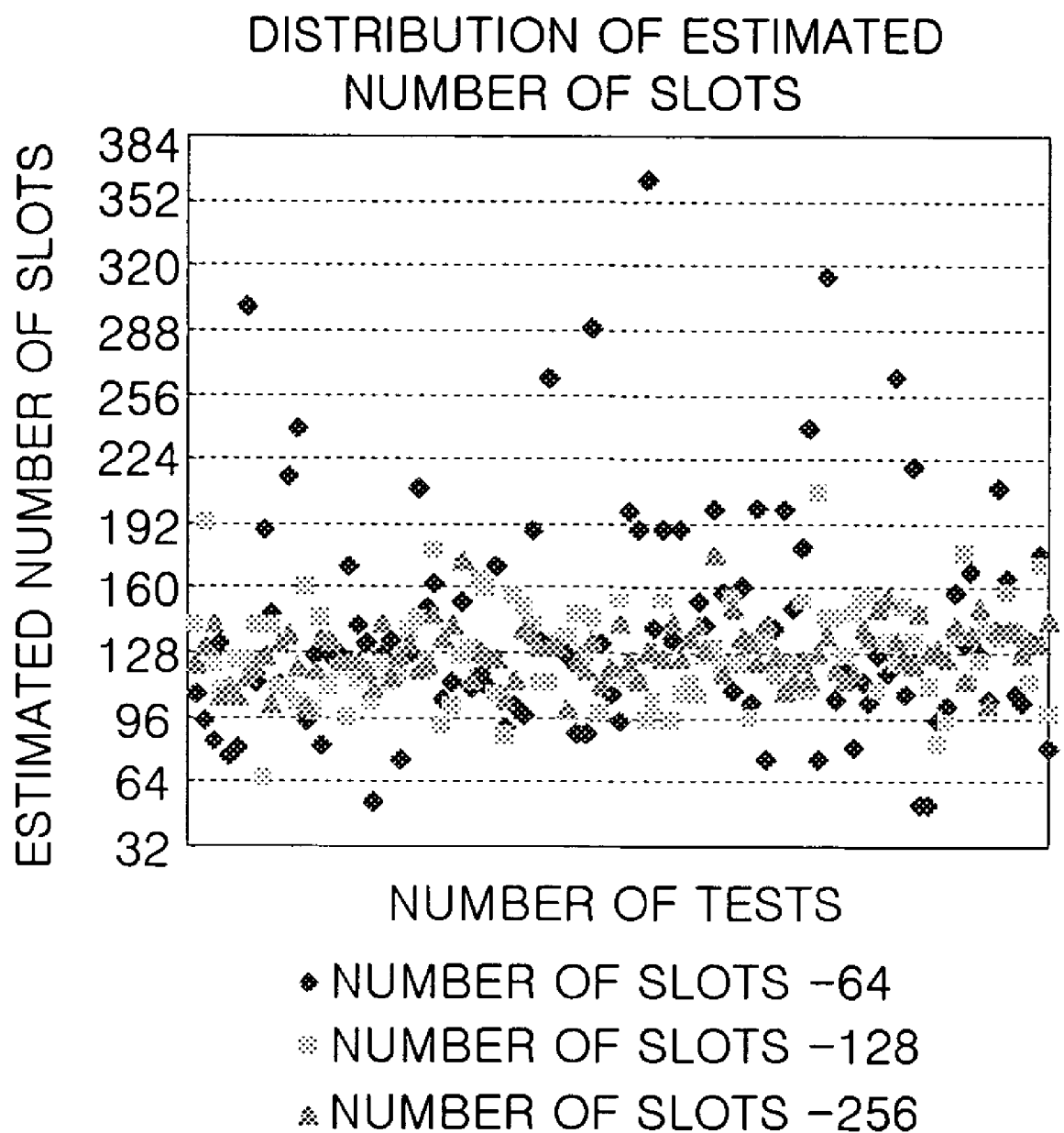
FIGS. 6A and 6B are graphs simulation results obtained by the method for estimating the number of tags in the slotted Aloha-based RFID system in accordance with the embodiment of the present invention.
Figure 6B:
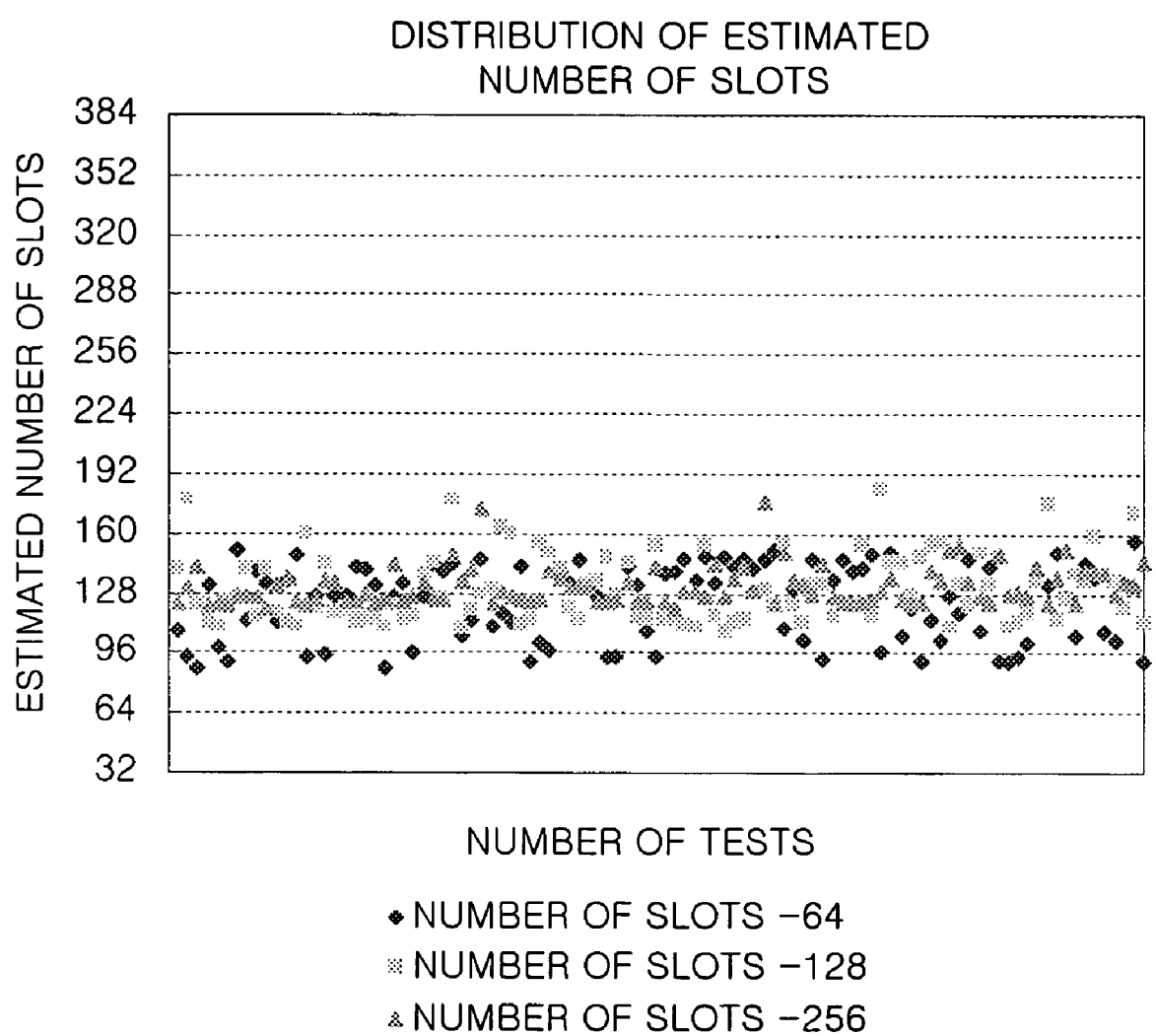

FIGS. 6A and 6B are graphs illustrating the simulation results obtained by the method for estimating the number of tags in the slotted Aloha-based RFID system in accordance with the present invention. When the number of the tags is 128, the number of the slots is set to 64, 128 and 256. At this point, the number of the tags estimated using the measured values is illustrated in FIGS. 6A and 6B.

As illustrated in FIG. 6A, most of the measured values are distributed around the average expected value of 128, but some of the measured values have a very large error. In addition, when a large number of the slots are selected, the measured values are distributed much more around the average expected value. Some of the measured values having large error can reduce the error with respect to the average expected value very easily by using the method of estimating the minimum value and the states of the slots, as illustrated in FIG. 6B.

As described above, the method for estimating the number of tags in the slotted Aloha-based RFID system can improve the system efficiency by efficiently estimating the number of the tags through the anti-collision algorithm of the slotted Aloha-based RFID system.

The above-described methods in accordance with the present invention can be stored in computer-readable recording media. The computer-readable recording media may include CDROM, RAM, ROM, floppy disk, hard disk, optical magnetic disk, and so on. Since these procedures can be easily carried out by those skilled in the art, a detailed description thereof will be omitted.

The present application contains subject matter related to Korean patent application No. 2005-0105074, filed in the Korean Intellectual Property Office on Nov. 3, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for estimating the number of tags in a slotted Aloha-based RFID system, the method comprising the steps of:
   a) setting the number (N) of slots, the measured number ($c_0$) of empty slots, and the measured number ($c_1$) of ID slots as parameters; and
   b) estimating the number (n) of the tags by substituting the set values into $n=(N-1)/(c_0/c_1)$.

2. The method as recited in claim 1, wherein the method for estimating the number of the tags is applied to an anti-collision algorithm of the slotted Aloha-based RFID system using a statistical average method.

* * * * *